United States Patent [19]

Newell

[11] 4,253,130
[45] Feb. 24, 1981

[54] METHOD AND APPARATUS FOR HEAT PUMP SYSTEM PROTECTION

[75] Inventor: Dennis E. Newell, El Segundo, Calif.

[73] Assignee: Robertshaw Controls Company, Richmond, Va.

[21] Appl. No.: 46,677

[22] Filed: Jun. 8, 1979

Related U.S. Application Data

[63] Continuation of Ser. No. 912,766, Jun. 5, 1978, abandoned, which is a continuation of Ser. No. 733,288, Sep. 18, 1976, abandoned.

[51] Int. Cl.³ .............................................. H02H 5/04
[52] U.S. Cl. .................................. 361/22; 62/324.1; 361/27
[58] Field of Search ................. 361/22, 25, 27, 28, 361/29; 62/324, 325; 318/305, 334, 471, 473

[56] References Cited

U.S. PATENT DOCUMENTS

| | | | |
|---|---|---|---|
| 3,777,240 | 12/1973 | Neill | 361/22 X |
| 4,028,593 | 6/1977 | Newell | 361/27 |

Primary Examiner—Harry E. Moose, Jr.
Attorney, Agent, or Firm—Fulwider, Patton, Rieber, Lee & Utecht

[57] ABSTRACT

Method and apparatus for monitoring a plurality of thermal parameters and the pressure related work load of a motor-compressor unit utilized in a heat pump system and providing protection for the motor-compressor by turning off the system for time periods dependent upon which parameter caused the system to be turned off.

14 Claims, 8 Drawing Figures

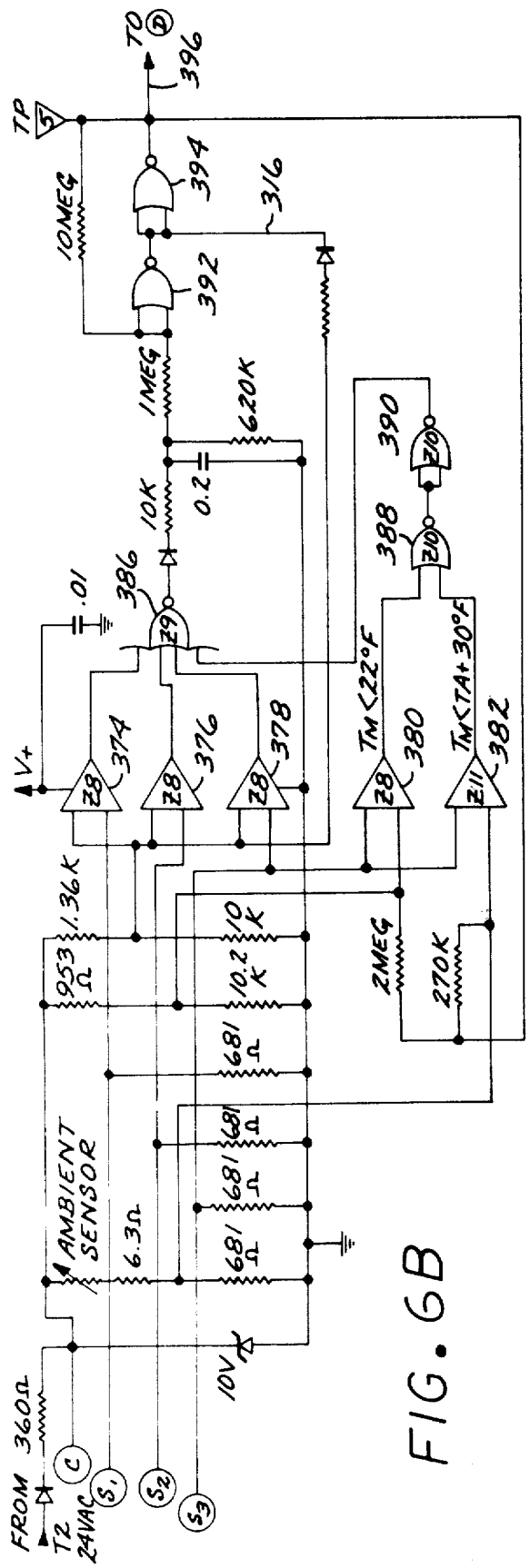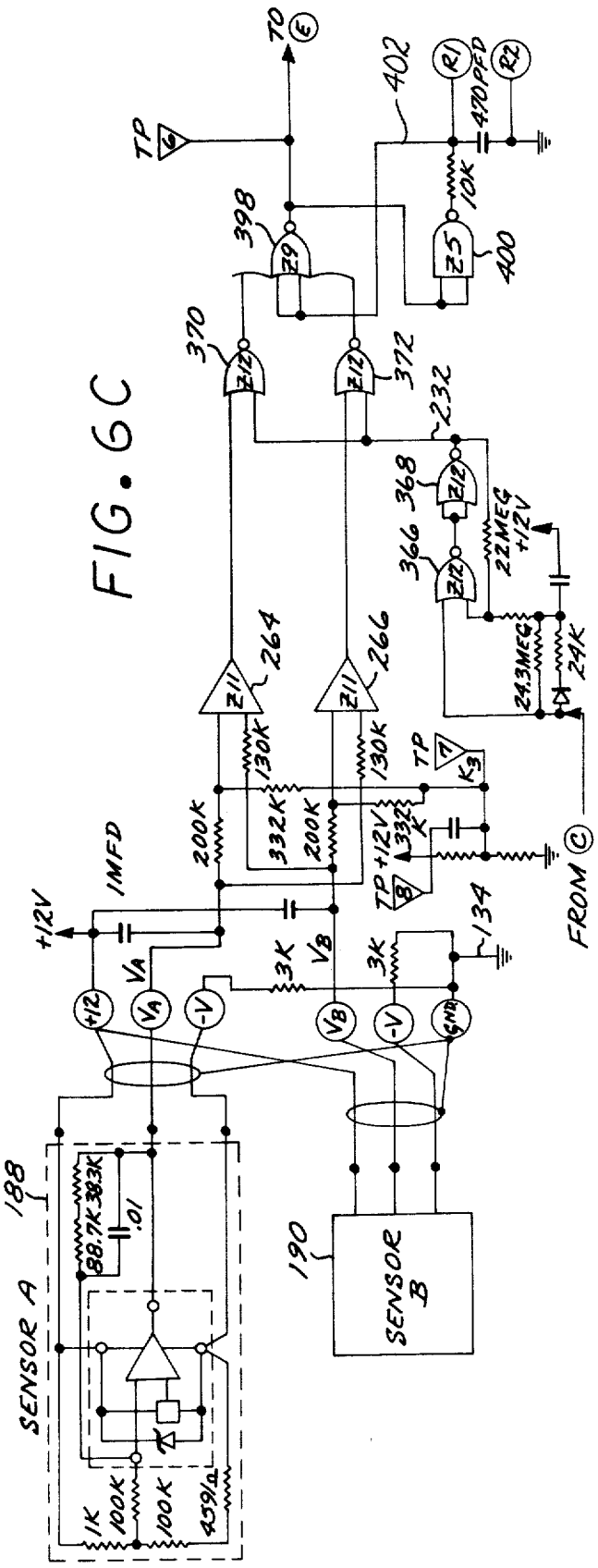

METHOD AND APPARATUS FOR HEAT PUMP SYSTEM PROTECTION

This is a continuation of application Ser. No. 912,766, filed on June 5, 1978, now abandoned which is a continuation of Ser. No. 733,288 filed on Sept. 18, 1976 and now abandoned.

BACKGROUND OF THE INVENTION

1. Field of the Invention

The present invention relates generally to heat pump systems and, more particularly, to a motor-compressor protection technique for such a system.

2. Description of the Prior Art

In heat pump systems designed to provide both cooling and heating for an enclosed space such as a room or entire building, a typical installation would have only the inside condenser/evaporator coils within the building and the outside condenser/evaporator coils and motor-compressor combination mounted outside of the building. Mounting such equipment outside of the building not only provides more usable space within the building but also removes the relatively noisy equipment from inside the building. However, placing the motor-compressor combination on the outside of the building subjects it to the weather which, in some locals, produces a wide range of ambient temperatures.

For motor-compressors used in such systems, there are practical limitations placed upon the thermal parameters of the motor and the work load to which it can be subjected before it will be damaged. Conventionally, limiting sensors were placed on the motor and the system turned off if the limits were exceeded. In addition, for the heat pump system itself, limit switches are conventionally placed on the high pressure, condenser side of the compressor and on the low pressure, evaporator side of the compressor so that if the pressure in the condensing side were exceeded, possibly indicating a blockage of the system, the motor-compressor would be turned off. Similarly, if the pressure in the evaporator side dropped below a fixed limit, possibly indicating leakage of the refrigerant, the motor-compressor and system would also be turned off. While temperature limit switches and the pressure limit cutoff switches protect the motor-compressor to a certain extent, conventional prior art practice has these sensors operating on fixed values and, since certain of the limiting factors and the damage point for the motor-compressor are not fixed values but are variable with various associated conditions, in some cases the motor-compressor could be operated under conditions where it would be damaged without any of the protecting sensors being activated.

Thus, conventional prior art practice in motor-compressor protection techniques for heat pump systems have not been completely satisfactory in that substantially complete protection is not attained and, under certain conditions, the motor-compressor could be damaged despite the proper operation of such prior protection techniques.

SUMMARY OF THE INVENTION

The heat pump protection system of the present invention provides substantially complete protection for a motor-compressor subjected to relatively extreme conditions such as that experienced in a heat pump system. Features of the protection system of the present invention include utilizing a plurality of temperature sensors optimally positioned within the motor windings and not only monitoring the output of these sensors but utilizing the output of one of the temperature sensors to perform a plurality of functions including setting a low temperature limit and a limit dependent upon the ambient temperature as has been suggested by others. If any of the temperature limits are exceeded, the system is turned off for a first predetermined time period or prevented from starting and the temperature limits reset or recalibrated so that the system will restart in a safe temperature range. If the system has corrected itself to the recalibrated limits when the first predetermined time limit expires, the system will restart. If not, the system remains off until the limits are met.

Another feature of the system of the invention is monitoring the work load of the motor by monitoring the difference in pressure between the condensing and evaporating sides of the compressor. The pressure is monitored indirectly by temperature which is converted to a voltage which is applied to circuitry for relating the voltages in a substantially linear arithmetic relationship which has been suggested as being more accurate. During the start-up time for the motor compressor combination, the operation of the pressure difference sensing circuitry is inhibited for a time sufficient for the heat pump system to stabilize pressure difference. If the pressure difference limit is exceeded, the system is also turned off for the predetermined time period after which the system may be turned on again if the limiting condition has corrected itself.

The heat pump system utilized in the presently preferred embodiment of the invention utilizes a two-speed motor-compressor and, when speed changes are made, the system is also turned off for a second predetermined time period to permit the heat pump system to equalize pressures to an extent which will not damage the motor-compressor when it is again turned on. The protection system includes circuitry to differentiate between a speed change, requiring the second predetermined turn-off period, and when the system is turned off or prevented from starting due to a temperature or pressure limit being exceeded.

Thus, the heat pump protection system of the present invention provides substantially complete protection for the motor-compressor based on the monitoring and processing of data from a plurality of sensors which provide not only preset limits but variable limits dependent upon system and environmental conditions.

DESCRIPTION OF THE DRAWINGS

FIGS. 6a-6c together are a logic circuit diagram of the motor protection system of the present invention.

Figure 1:
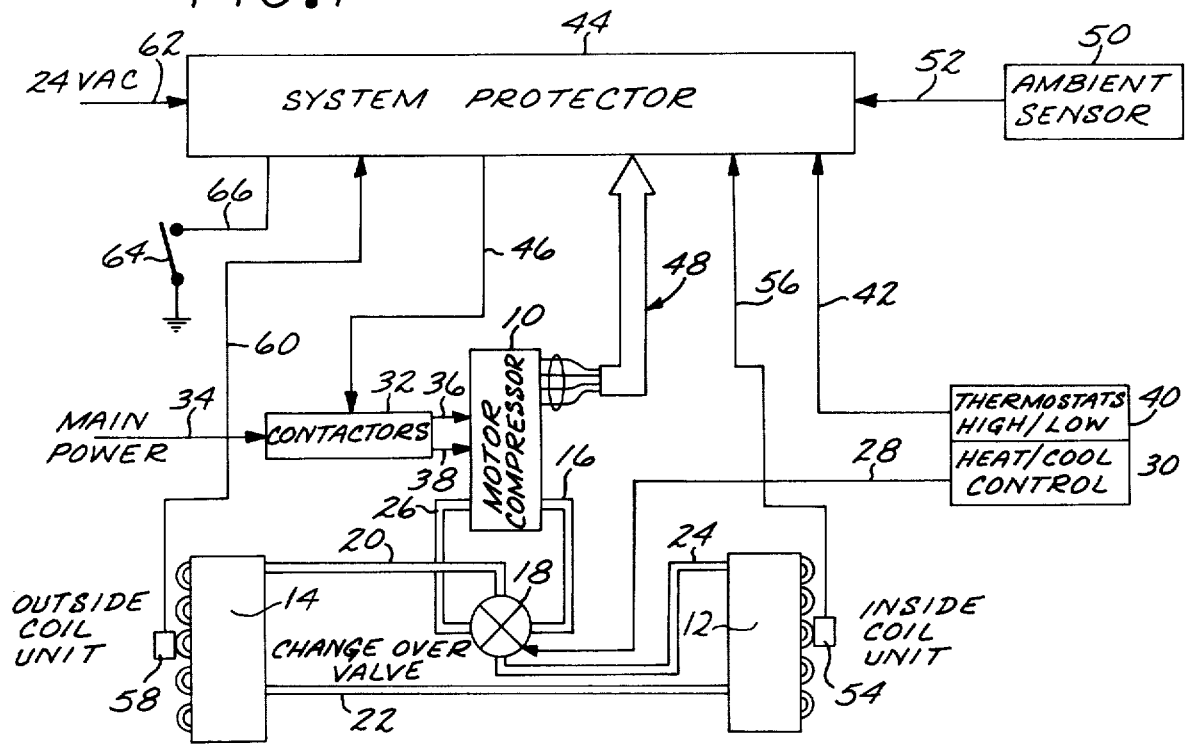
FIG. 1 is a block diagram of the operating environment for the heat pump protection system of the invention.

Turning now to the drawings, particularly FIG. 1 thereof, the heat pump protection system of the present invention is designed for use with a system for heating or cooling a building or room. Typically, such systems include a motor-compressor combination 10, an inside coil unit 12 within the building or room and an outside coil unit 14 mounted outside of the building or room. The inside and outside coil units 12 and 14, respectively, can serve either to heat or cool depending on whether they are operated as a condensing or as an evaporating unit. Therefore, a high pressure outlet conduit 16 from the motor compressor 10 is connected through a changeover valve 18 to either of the inside or outside coil units 12 or 14, respectively.

As an example, if the heat pump system were operated to cool the building, the inside coil would be operated as a low temperature low pressure evaporator and the outside coil unit 14 would be operated as a high temperature, high pressure condenser. The high pressure outlet conduit 16 of the motor-compressor 10 would then be connected through changeover valve 18 to an inlet conduit 20 of the outside coil unit 14. The outlet conduit 22 of the outside coil unit is commonly connected to the inlet of the inside coil unit 12 whose outlet conduit 24 is connected through the changeover valve to the low pressure inlet 26 of the motor-compressor 10.

If the heat pump system were to be used to heat the building or room, the functions of the inside and outside coil units 12 and 14 could be reversed by operating the changeover valve 18 by means of a control signal on a line 28 from a heat/cool control unit 30 placed within the building or room.

The motor-compressor 10 utilizes a two speed motor and is operated through contactors 32 from a main power line 34 to provide power to a high speed line 36 or a low speed line 38 to the motor. The high and low speeds for the motor are selected by means of a dual switch thermostat 40 providing a high and low speed control signal through a line 42 to a system protector 44, to be described in detail below, which in turn provides control signals on a line 46 to the contactors 32.

The system protector 44 is designed to provide thermal and work load protection for the motor-compressor 10 and, therefore, the output of a plurality of temperature sensors placed within the motor-compressor are connected through a bus 48 to the system protector. As some of the temperatures within the motor must be related to the ambient temperature around the motor, an ambient sensor 50 is connected through line 52 to the system protector 44. To monitor the work load of the motor-compressor, the pressure within the inside and outside coil units 12 and 14 are indirectly monitored by means of a temperature sensing module 54 mounted on the inside coil unit and connected through a line 56 to the motor system protector 44 and another temperature sensing module 58 mounted on the outside coil unit 14 and connected through a line 60 to the system protector. The operation of the temperature sensing modules 54 and 58 and the processing of their signals within the system protector 44 will be described in detail below.

The system protector 44 is powered by 24 volts A.C. through a line 62. Certain of the protecting operations of the system protector 44 result in the heat pump system being turned off with a selectable option of either automatic resetting or manual resetting through a reset switch 64 connected through a line 66 to the system protector.

Figure 2:
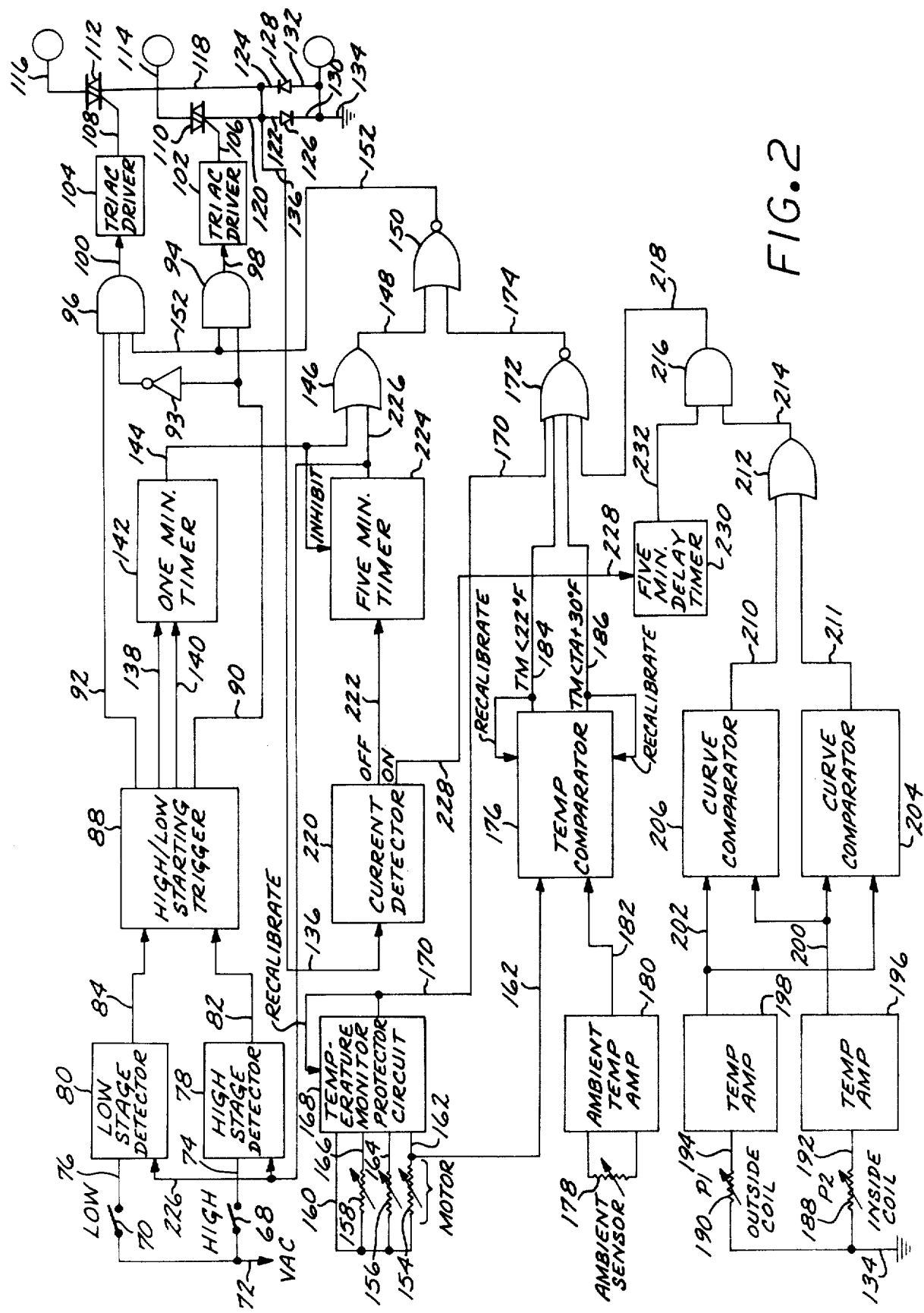
FIG. 2 is a block diagram of the heat pump protection system of the invention.

The basic operation of the system protector 44 shown in FIG. 1 is best illustrated by the combined block and logic diagram of FIG. 2. Generally, three types of protection are provided. The first of protection utilized when the system is operating correctly and a motor speed change is called for. When the motor is changed from high speed to low speed or from low speed to high speed it is desirable that the pressure difference across the compressor be allowed to decrease somewhat in order to avoid transient loads when the motor changes speed.

Another type of protection afforded by the system of the invention is for temperature limitations to prevent damage to the motor-compressor. In this area, the temperature limitations are not only for absolute high temperature to prevent motor winding insulation damages but there are also low temperature limitations to prevent compressor start up damage when compressor parts differential expansion has locked up the moving parts and minimum ambient temperature difference limitations which must be maintained in order to prevent damage to the compressor due to possible liquid accumulation in the compressor.

A third area of protection for the motor-compressor is the work it can perform without damage. In this area, the work load is dependent upon a pressure relationship in the system between the inside coil unit 12 and the outside coil unit 14. The limiting work load which the motor-compressor can perform without damage is substantially defined by a straight line linear relationship between the pressures in the coil units 12 and 14, respectively. The system of the invention utilizes electronic circuitry to relate the two pressures in the system, as described below, and to turn off the system if the linear relationship boundary is exceeded.

For the speed change protection, as shown in FIG. 2, the high and low thermostat switches 68 and 70, respectively of the thermostat 40 (FIG. 1) each connect an A.C. voltage source on a line 72 through respective input lines 74 and 76 to high and low stage detectors 78 and 80, respectively, which convert the switch closings to D.C. logic signals on output lines 82 and 84, respectively. An inhibit signal on a line 226 connected to both high and low stage detectors 78 and 80, respectively, serves to inhibit the operation of the speed change protection system when certain other protection circuitry is operative, as will be explained in greater detail below. The high and low logic level outputs on lines 82 and 84 are connected as inputs to a high/low staging detector which generates high and low stage signals on lines 90 and 92, respectively, which indicate that the high or low thermostat switches 68 or 70 are closed.

These high and low stage signals on lines 90 and 92 are generated if either of the switches 68 and 70 are separately closed with no transition from one to the other. The high and low stage signals on lines 90 and 92 are connected directly as first inputs to AND gates 94 and 96 respectively which, when enabled, generate outputs on lines 98 and 100 which activate triac drivers 102 or 104. The outputs of the triac drivers 102 and 104 on lines 106 and 108 are connected to the gate inputs of a pair of triacs 110 and 112 which effectively serve as switches for energizing the high or low contactors 32 (FIG. 1) through output lines 114 and 116, respectively. The contactor circuits are completed by connecting the remaining terminals of the triacs 110 and 112 through lines 118 and 120 to the commonly connected anode and cathode terminals 122 and 124 of oppositely connected diodes 126 and 128, respectively, with their opposite terminals 130 and 132, respectively, being connected to the system ground 134. The terminals 122 and 124 have a signal on line 136 which indicates whether or not either of the triacs 110 and 112 is on. The use of the current signal on line 136 is described below.

Returning to the high/low staging detector 88 operation if either of the high or low thermostat switches 68 and 70 is closed, and the environmental conditions in which the thermostat is placed indicate that a transition from either high to low or low to high is needed, safe operation of the motor-compressor 10 (FIG. 1) requires that the system be turned off for a short period of time (approximately one minute for the presently preferred embodiment) to allow the pressure difference across the inlet and outlet of the compressor to equalize somewhat to avoid transients during the speed change.

Therefore, the high/low staging detector 88 detects a low to high or high to low change of the thermostats and generates corresponding signals on lines 138 and 140, respectively which serve as triggering inputs to a one minute timer 142 which in turn generate a turn-off signal on a line 144 connected as an input to an OR gate 146 the output of which on a line 148 is a first input to a NOR gate 150. The output of NOR gate 150 on line 152 is an inhibit signal on inputs to AND gates 94 and 96, respectively. When the gates 94 and 96 receive the inhibit signal, their outputs on lines 98 and 100, respectively, turn off the triac drivers 102 and 104 resulting in the entire system being turned off for one minute. When the one minute timer 142 times out, the triac drivers 102 and 104 are again enabled and the system is again turned on.

In the case where both switches 68 and 70 open or when there is a power interruption, the system is turned off for a full five minutes. This is accomplished by connecting the current signal on line 136 to a current detector 220 which generates an enabling signal on a line 222 when the current is off. The signal on line 222 starts a five minute timer 224 which generates an inhibit signal on its output line 226 which again inhibits gates 94 and 96 to turn off the system.

When the one minute speed change timer is started, its output on line 144 also serves as an inhibit signal to prevent starting the five minute timer 224.

Thus, the operation of the speed change protection portion of the heat pump protection system of the invention operates to detect transitions from high to low or low to high speed changes and turns off the system for one minute to enable the pressure difference across the compressor to equalize to the extent that motor damage is avoided. However, when the high or low speed thermostat switches 68 or 70 are simply closed, the triac drivers 102 or 104 are immediately activated.

The circuitry for the presently preferred embodiment of the speed change protection portion of the invention is shown in the top half of FIG. 6A which will be explained more fully below.

In the temperature protection portion of the system, three separate operations are performed. First, a plurality of high temperature sensors are provided and positioned within the motor windings to limit the maximum temperature at which the motor will continue to operate. Secondly, a low temperature cutoff is provided below which the motor will not start. The low temperature cutoff is provided because the compressor motor could be damaged if started at very low temperatures due to the unequal coefficients of expansion of the various parts of the compressor. Thirdly, the motor temperature is compared with the ambient temperature and, unless the motor is a predetermined number of degrees warmer than ambient, there is imminent danger of liquid in the compressor and the motor will not start.

Thus, again referring to FIG. 2 in the high temperature sensing section, three temperature sensors in the form of temperature sensitive resistors 154, 156 and 158 are provided with a common lead 160 connected to one terminal of each of the resistors and their opposite terminals 162, 164 and 166 connected as inputs to a temperature monitor circuit 168. The temperature monitor circuit 168 will produce a high temperature signal on an output line 170 whenever the temperature at any of the sensors 154, 156 and 158 exceeds a fixed predetermined value. The high temperature signal on line 170 is applied as one input to an NOR gate 172 the NOR gate 172 the output of which on line 174 is connected as an input to the NOR gate 150 which then generates an inhibit signal on line 152 which, when applied as an input to AND gates 94 and 96 turn off the triac drivers 102 and 104 which turns off the system. A feature of the present invention is that, when a high temperature signal on line 170 is generated, it is also fed back into the temperature moniter circuit 168 to "recalibrate" the fixed predetermined value to a lower temperature. This means the system must "cool down" to a lower temperature before it will again turn on.

The output of one sensor 154 is also connected through line 162 as a first input to a temperature comparator 176 and the output of an ambient temperature sensor 178 is connected through an ambient temperature amplifier 180 as a second input through line 182 to the temperature comparator. The operation of the temperature comparator 176 is such that the motor temperature on line 162 is continuously compared with a voltage representative of a predetermined low limiting temperature (22° F.). If the motor temperature drops below that predetermined low temperature, a turn-off signal is generated on line 184 and is connected as a second input to the NOR gate 172 which, as described above, prevents the system from starting. In addition, a small portion of the signal on line 184 is fed back to that section of the comparator to recalibrate the system to a higher temperature to prevent chatter.

Similarly, the motor temperature signal on line 162 is continuously compared with the ambient temperature signal on line 182 and, if the motor temperature drops below the ambient temperature plus a predetermined temperature offset (30° F.), a turn-off signal will be generated on line 186 which is connected as a third input to the NOR gate 172, also preventing the system from starting. Again, a small portion of the signal on line 186 is fed back to comparator 176 to recalibrate the system to a higher temperature difference to prevent chatter.

Thus, the temperature monitoring portion of the system of the present invention will protect the system if three separate temperature factors are exceeded and a single sensor 154 is utilized in all three sections.

The actual circuitry utilized in the temperature monitoring portion of the presently preferred embodiment of the invention is shown in FIG. 6B and will be discussed below.

The third portion of the protection system of the invention monitors the pressure in the inside and outside coil units 12 and 14 (FIG. 1) and produces a turn-off signal if a limiting substantially straight line relationship between those pressures is exceeded, as has been suggested by others. Thus, referring again to FIG. 2, the pressures on the inside and outside coil units 12 and 14 are sensed indirectly by means of temperature which affect temperature sensors 188 and 190 which have one terminal connected to system ground 134 and their opposite terminals 192 and 194, respectively, connected as inputs to amplifiers 196 and 198. The outputs of amplifiers 196 and 198 are each connected as inputs on lines 200 and 202 to a pair of curve comparators 204 and 206 either output of which on lines 211 and 210 indicates that the straight line relationship between the pressures has been exceeded. The outputs on line 208 and 210 from the curve comparators 204 and 206, respectively, are connected to an OR gate 212 the output of which on line 214 is a first input to an AND gate 216. When the AND gate 216 is enabled as discussed below, its output on line 218 is connected as a fourth input to the NOR gate 172 which generates the inhibit signal which turns off the system, as discussed above.

Figure 3:
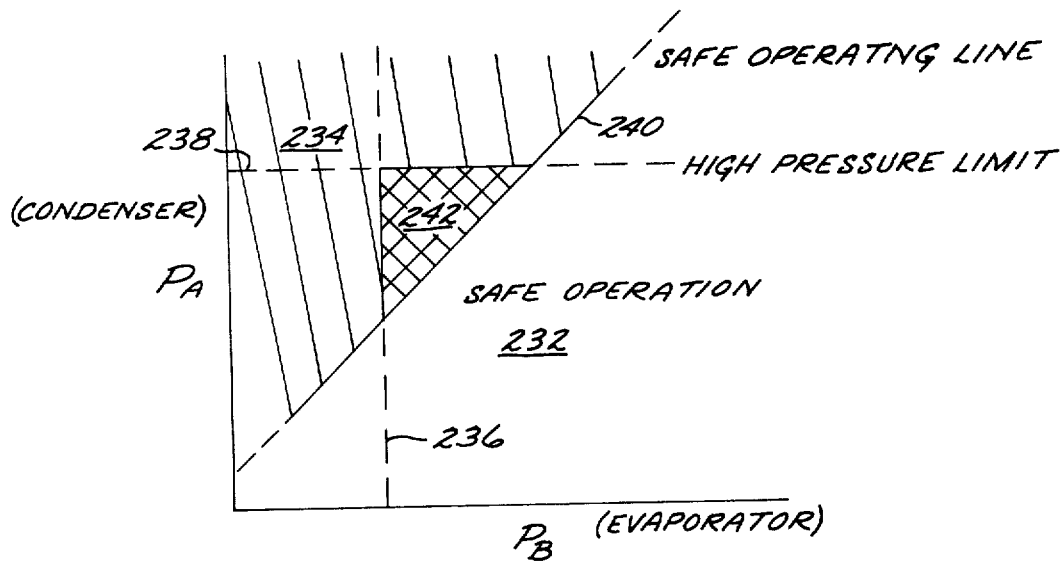
FIG. 3 is a graph representing the relationship between the condensing and evaporating pressures across the compressor illustrating the region of safe operation.

FIG. 3 is a graph illustrating the pressure relationship with the region of safe operation 232 being shown unshaded and the region of unsafe operation 234 or overload condition for the compressor being shown shaded. FIG. 3 also shows the conventional prior art fixed pressure limits in the form of a low pressure limit line 236 and a high pressure limit line 238 which define a rectangular area of formerly allowable operation for the system. It should be noted that a safe operating line 240 defines a cross-hatched section 242 which represents a region of unsafe operation in which the prior art protection techniques would permit the system to operate. Thus, the protection system of the present invention provides adequate protection.

Figure 4:
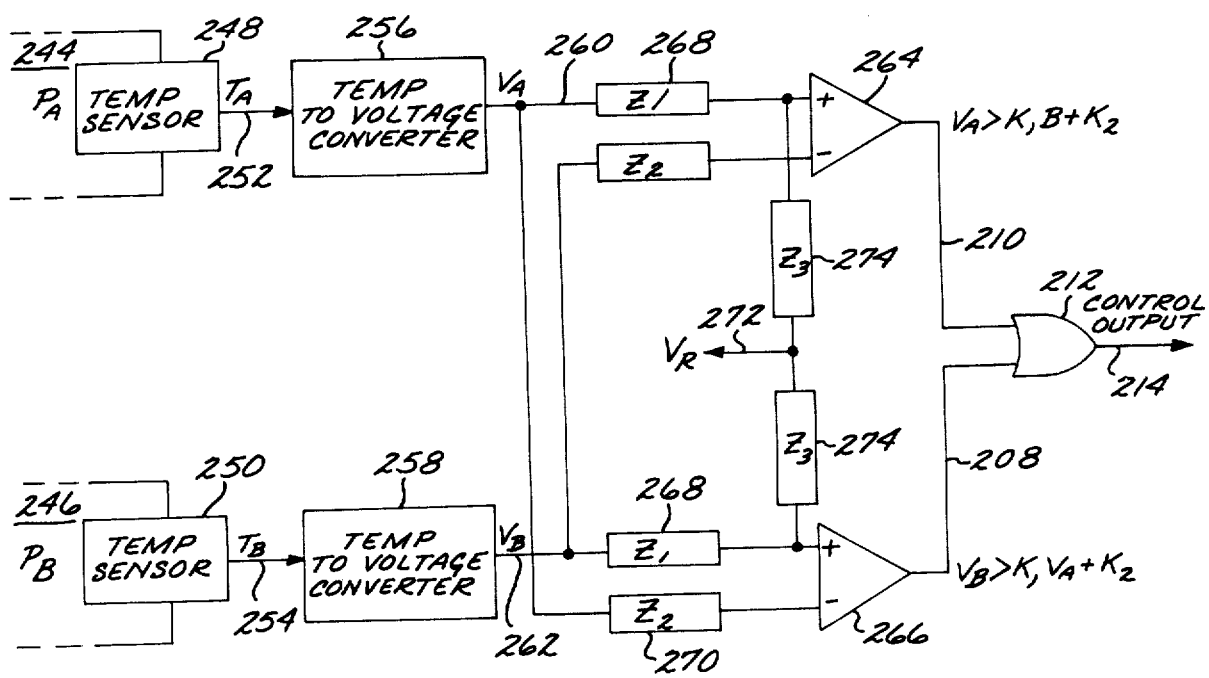
FIG. 4 is a combined block and logic diagram of the circuitry utilized in the present invention for monitoring compressor pressures according to the graph shown in FIG. 3.

The substantially linear relationship between the pressures illustrated in FIG. 3 is implemented in the system of the invention in a manner illustrated in FIG. 4. Basically, the actual pressures within the condensing and evaporating coils represented by the diagramatic pressure regions $P_A$ (244) and $P_B$ (246), respectively, are indirectly sensed by means of associated temperature sensors 248 and 250, respectively which produce temperature signals $T_A$ and $T_B$ on lines 252 and 254, respectively, which are substantially directly representative of pressures for heat pump systems in which the protection system of the present invention is used.

The temperature signals on lines 252 and 254 are inputs to temperature to voltage converters 256 and 258, respectively which produce at their output voltages $V_A$ on line 260 and voltage $V_B$ on line 262 which are also directly representative of the pressures $P_A$ and $P_B$. The voltages $V_A$ on line 260 and $V_B$ on line 262 are connected as cross-coupled inputs to a pair of operational amplifiers 264 and 266 which serve as comparators. Thus, voltage $V_A$ is connected through an impedance $Z_1$ (268) to the non-inverting input of amplifier 264 and also connected through an impedance $Z_2$ (270) to the inverting input of amplifier 266. Similarly, voltage $V_B$ on line 262 is connected through impedance $Z_1$ (268) to the non-inverting input of amplifier 266 and through impedance $Z_2$ (270) to the inverting input of amplifier 264. A reference voltage $V_R$ on line 272 is connected through impedances $Z_3$ (274) to the non-inverting inputs of both amplifiers 264 and 266.

The cross-coupled amplifiers 264 and 266 are used so that the heat pump system can be switched between cooling and heating without switching the sensor outputs. Therefore, one of the amplifiers 264 and 266 will be operative in a heating mode and the other of the amplifiers will be operative in a cooling mode. The outputs of the amplifiers 264 and 266 on lines 208 and 210 are connected as inputs to the OR gate 212 which then generates the turn-off signal on line 214, as discussed above.

When any of the four inputs to the NOR gate 172 cause the inhibit signal to be generated, the system is turned off and the current signal on line 136 from the diodes 126 and 128 indicates no current through the triacs 110 and 112 and the five minute timer 224 is started. The output of the five minute timer 224 on line 226 generates an inhibit signal which is connected as a second input to the OR gate 146 and prevents the system from being turned on for five minutes regardless of the condition of the temperature and pressure monitors.

It should be appreciated that when the heat pump system is first started or if the system is turned off in response to the motor protection system of the present invention the pressure difference across the motor-compressor 10 equalizes and the linear relationship between the pressures which is monitored by the curve comparators 204 and 206 may indicate an unsafe operating condition. Therefore, the operation of the curve comparators 204 and 206 is inhibited for a predetermined time period during which the heat pump system can develop the normal operating pressure difference across the compressor. Thus, a current on signal on a line 228 from the current detector 220 is connected as a start input to a five minute delay timer 230. The five minute delay timer 230 generates a signal on a line 232 which serves as an inhibit input to AND gate 216.

As briefly discussed above with reference to FIG. 2, the high/low staging detector monitors the operation of the thermostat switches 68 and 70 and immediately operates the triac drivers 102 and 104 if the switches are operated individually but, if the switches are operated sequentially, the system is turned off for one minute to permit partial equalization of the pressures across the compressor. If the protector circuits are triggered or both switches are turned off or the power is interrupted, the system is turned off for a minimum of five minutes to permit both pressure equalization across the compressor.

Figure 5:
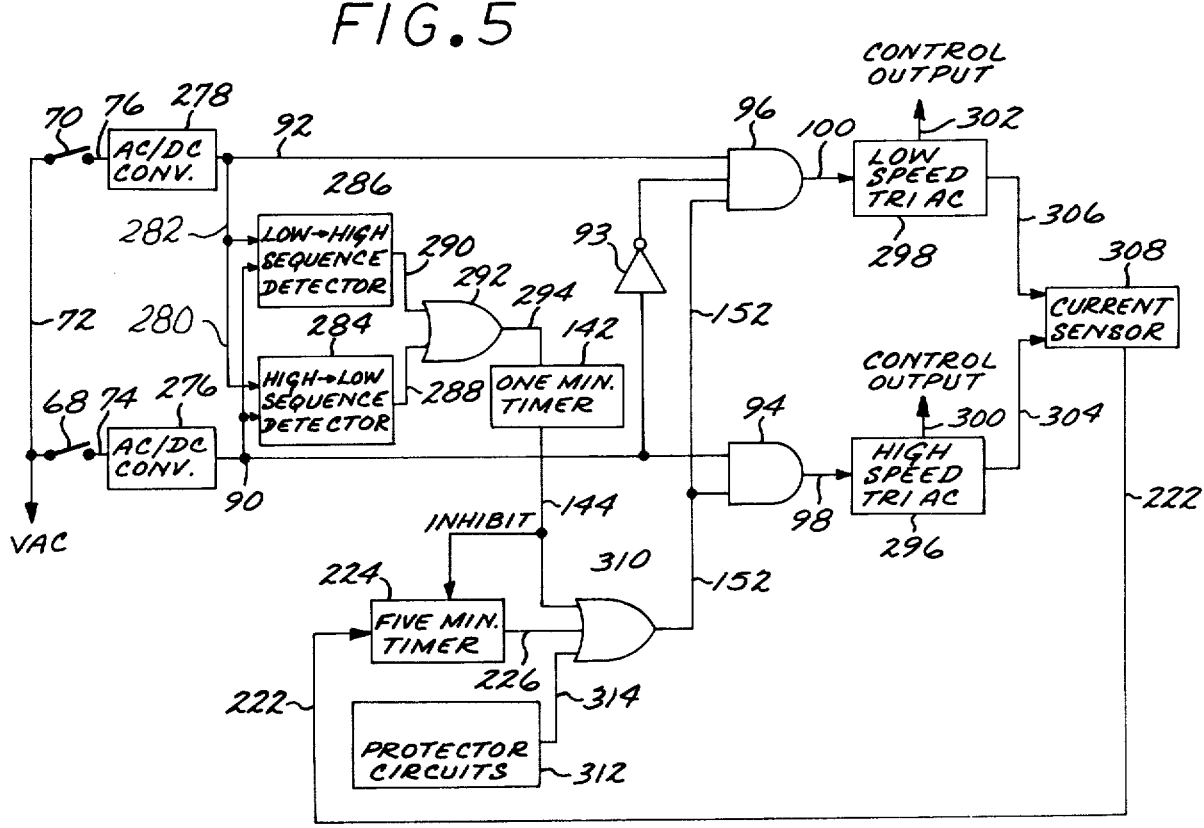
FIG. 5 is a combined block and logic diagram illustrating the operation of the turn off timing devices for the speed change and the motor protector circuits.

The relationship between the one and five minute timers is illustrated in more detail in FIG. 5. In a manner similar to that shown in FIG. 2, the high and low thermostat switches 68 and 70 are supplied with a source of A.C. voltage on line 72 and the closing of the switch provides an input on lines 74 and 76 respectively to A.C. to D.C. converters 276 and 278 which provide logic level D.C. outputs on lines 280 and 282 which are each connected as inputs to a high-to-low and low-to-high sequence detectors 284 and 286 which detect sequential switch closures and generate appropriate output signals on lines 288 and 290 which are inputs to an OR gate 292, the output of which on line 294 activates the one minute timer 142.

The unsequenced signals on lines 90 and 92 are connected as inputs to the AND gates 94 and 96 as discussed above. Again, inventor 93 is provided to insure the priority of the high speed signal should the two thermostat switches happen to be closed at the same time. Again, the output of the AND gates 94 and 96 on lines 98 and 100 operate high and low speed triac systems 296 and 298 which generate control output signals on lines 300 and 302 which operate the main contactors 32 (FIG. 1) supplying power to the motor compressor unit 10. Each of the triac control units 296 and 298 have outputs on line 304 and 306, respectively, which serve as inputs to a current sensor 308 which detects the presence of current through the triacs indicating that the system is on. Each of the AND gates 94 and 96 has an inhibit signal input on line 152 which is the output of a generalized OR gate 310 which has three inputs which will cause the inhibit signal to be generated. The first input is from the one minute timer 142 on line 144 as discussed above. The one minute timer system on line 144 is also connected as an inhibiting control signal to the five minute timer 224. It should be noted that whenever the current through the system is turned off, the current sensor 308 generates a current off signal on line 222 which in the absence of the inhibit signal on line 144 would initiate the five minute time period.

A second input to the generalized OR gate 310 is from any of the motor protection circuits 312 which has an output on line 314 which turns the system off if any of the faults discussed above occur. As noted, when the system is turned off a start signal on line 222 is applied to the five minute timer 224 which then generates a control signal on line 226 which serves as a third input to the OR gate 310 and maintains the system in an off condition for at least the five minute time period. Thus, in the protection system of the present invention, two system turn-off time periods are provided, one for normal turn off of the system by the thermostat or a power interruption and a second time period which operates between motor speed changes.

Figure 6A:
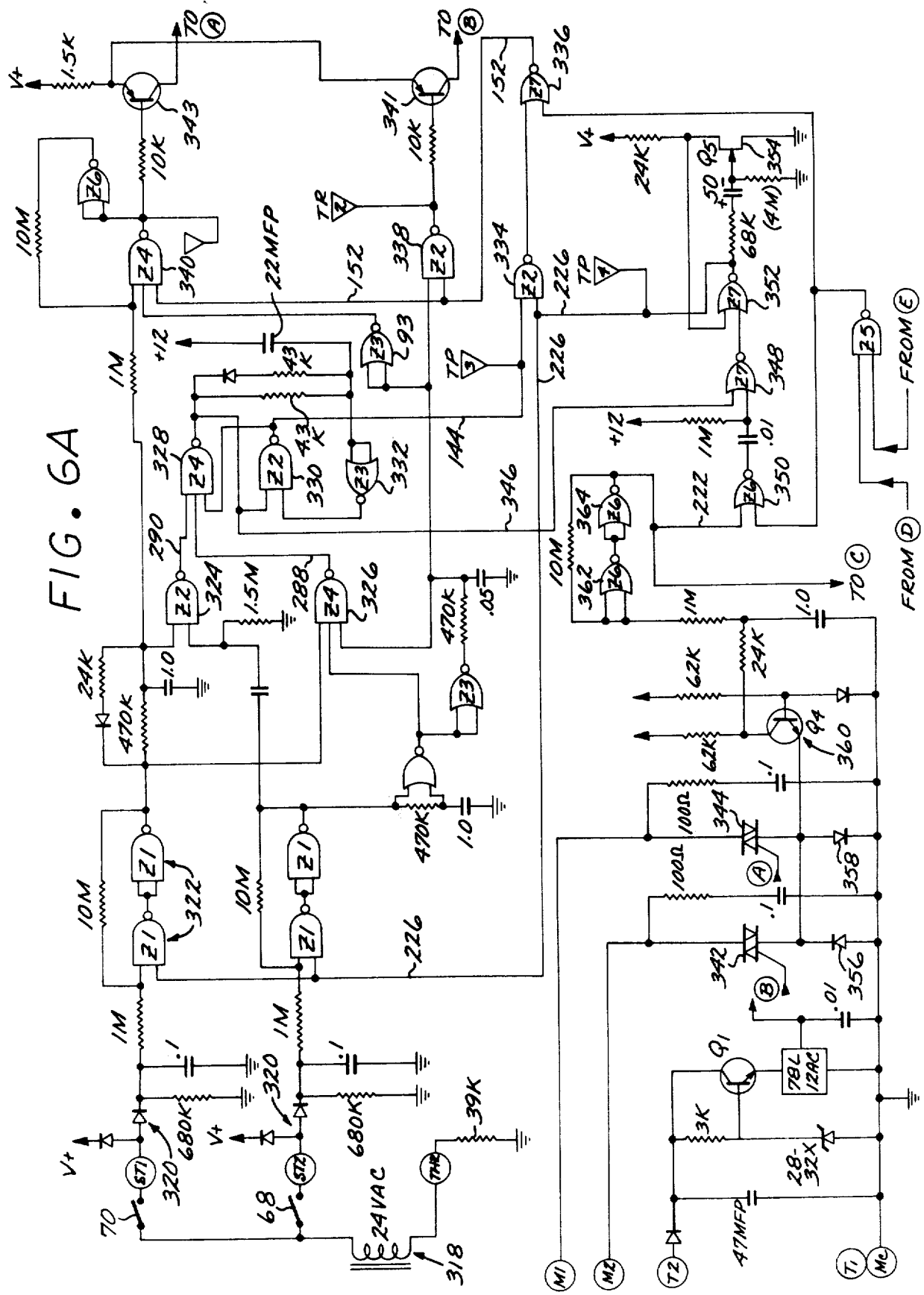

The circuit diagrams for the presently preferred embodiment for the motor protection system of the invention are shown in FIGS. 6a-6c. The unlabeled component values for the circuits shown in FIGS. 6a-6c are listed in Appendix A, below. The circuitry operates as described above with reference to the block diagrams.

In the speed change timing and detection circuitry (FIG. 6a), the thermostat switches 68 and 70 connect an A.C. voltage derived from a transformer secondary 318 to conventional rectifying circuits 320 to conventional threshold circuitry including the NAND gates 322 which generate at their outputs D.C. voltages at logic levels. These outputs are coupled through time dependent circuitry to NAND gates 324 and 326 which form the low-to-high and high-to-low, sequence detectors 286 and 284, respectively (FIG. 5). The output of the sequence detectors on lines 288 and 290 serve as activating inputs to a one minute timer circuit including the AND gates 328 and 330 and the NOR gate 332. The output of the one minute timer on line 144 serves as one input to an NAND gate 334 the output of which is an input to a NOR gate 336 whose output on line 152 is an inhibiting input to the AND gates 338 and 340 which, in turn, turns off the triacs 342 and 344 through driving transistors 341 and 343.

Another output of the one minute timer on a line 346 is an inhibiting input to a NOR gate 348 which together with NOR gates 350 and 352 and the field effect transistor 354 form a five minute timer. The output of the five minute timer on line 226 serves as another input to the NAND gate 334 which turns off the triacs 342 or 344 and is also connected as inhibiting inputs to NAND gates 322 to disable the thermostat control when the five minute timer is in operation. The five minute timer is started by a signal from the current sensor 308 (FIG. 5) which is a pair of diodes 356 and 358 in the triac circuit together with a transistor amplifier 360 and logic level converter including the NOR gates 362 and 364 which generates an appropriate signal on the line 222 to start the five minute timer. The "on" signal on line 222 also is connected to the five minute delay timer 230 (FIG. 2) which includes the NOR gates 366 and 368 (FIG. 7) which generates a signal on line 232 which serves as an inhibiting input to NOR gates 370 and 372 in the output circuitry of the coil pressure sensing comparator.

The temperature and pressure sensing circuitry is shown in FIG. 6b with the outputs of the temperature sensors being connected through resistive voltage dividing networks as inputs to operational amplifiers 374, 376, 378, 380, 382, 264, and 266. As discussed above, an output from any of the temperature or pressure sensing circuits serves as an alternative inhibiting input to the operation of the triacs 342 and 344. Also, an inhibiting output starts the operation of the five minute timer. Thus, the outputs of the operational amplifiers 374, 376 and 378 are connected as alternative inputs to a NOR gate 386 which also has an input derived from the outputs of operational amplifiers 380 and 382 connected through the NOR gates 388 and 390. The output of NOR gate 386 is connected through NOR gates 392 and 394, serving as a Schmidt trigger to generate a signal on line 396 to disable the triacs 342 and 344.

The outputs of NOR gates 392 and 394 also serve as feedback circuits through lines 316 and 396, respectively, to the operational amplifiers 374, 376 and 378 and operational amplifiers 380 and 382, respectively, to set the recalibrated cool down temperatures, as discussed above.

The outputs of the operational amplifiers 264 and 266 in the commercially available coil pressure sensing circuits 188 and 190 are connected through NOR gates 370 and 372 to a lockout circuit including the NOR gate 398 and NAND gate 400. Thus, if the coil pressure circuit is triggered an output on line 402 disables the triac but the circuit cannot be turned on again unless a circuit is closed across the terminals $R_1$ and $R_2$. If an automatic reset is desired, a jumper wire is connected between terminals $R_1$ and $R_2$ or, alternatively, a manually operated reset switch 64 (FIG. 3) can be connected across those terminals.

The coil temperature sensors 188 and 190 are identified and commercially available temperature sensing modules (58 and 54, FIG. 1). The temperature sensors are connected with their associated adjusting resistors as shown for the presently preferred embodiment of the invention.

Thus, the heat pump protection system of the present invention provides three separate types of protection; a shut down equalization period which is short for normal motor speed changes and longer for normal shut down or power interruption a thermal protection system which monitors not only high temperatures but a low temperature limit and ambient difference. Also, the system of the invention monitors the pressures in the evaporating and condensing coils and relates them to a substantially linear safe operation relationship curve. The system utilizes a common sensor for a number of temperature monitoring functions. A start up delay time period is provided for the pressure monitoring circuits so that the heat pump system can reach its normal operating parameters before monitoring begins.

While a presently preferred embodiment of the heat pump protection system of the invention has been described in detail above, it should be appreciated that many operative and circuit configurations may be utilized in implementing the system of the invention. Therefore, the scope of the invention is not to be limited except by the claims.

| Appendix A | | |
|---|---|---|
| Z1 | — | MC14011CP |
| Z2 | — | MC14011CP |
| Z3 | — | MC14001CP |
| Z4 | — | MC14023CP |
| Z5 | — | MC14011CP |
| Z6 | — | MC14001CP |
| Z7 | — | MC14001CP |
| Z8 | — | RC4136DP |
| Z9 | — | MC14002CP |
| Z10 | — | MC14001CP |
| Z11 | — | RC4136DP |
| Z12 | — | MC14001CP |
| Z13 | — | 78L12AC |
| Z14 | — | LM3911 National Temp Sensor |
| RT1 | — | T106A1SS |
| RT2 | — | T106A1SS |
| All Unlabeled diodes are 1N4$\phi\phi$4 | | |
| Q1 | — | 2N5961 |
| Q2 | — | 2N4249 |
| Q3 | — | 2N4249 |
| Q4 | — | 2N5961 |
| Q5 | — | Motorola MPF112 FET |

What is claimed is:

1. A method for controlling the speed of a two-speed motor in response to a two speed thermostatic switch, said method comprising the steps of:
   sensing the operation of first and second thermostatic switches which are sequentially operable with temperature changes, each of said switches being associated with a particular motor speed;
   sensing the sequential operation of said switches within a first predetermined time period and generating a control signal in response thereto;
   generating an inhibit signal for a second predetermined time period in response to said control signal;
   supplying power to said motor for each of said motor speeds in accordance with the operation of said switches, said inhibit signal inhibiting the supplying of power to said motor for either of said motor speeds.

2. A motor speed control, comprising:
   first and second thermostatic switches sequentially operable with temperature changes, each of said switches being associated with a particular motor speed;
   means for sensing sequential operation of said switches and generating a control signal in response thereto;
   means for generating an inhibit signal for a predetermined time period in response to said control signal;
   means for supplying power to said motor for each of said motor speeds in accordance with the operation of said switches, said means for supplying power being turned off in response to said inhibit signal.

3. An apparatus as defined in claim 2 wherein:
   said means for sensing includes a low-to-high and high-to-low sequence detectors each of which have inputs indicative of the operation of said first and second thermostatic switches, the output of said sequence detectors being connected as inputs to an OR gate the output of which provides said control signal;
   said means for generating an inhibit signal includes a timing circuit, the timing function of which is initiated by said control signal and the output of said timing circuit being said inhibit signal; and
   said means for supplying power to said motor includes first and second AND gates each having as one input an indication of the operation of said first and second thermostatic switches and as second inputs said inhibit signal, the outputs of said first and second AND gates being an enabling signals for supplying power to said motor, whereby said enabling signals are directly generated through said AND gates in the absence of sequential operation of said switches and inhibited for said predetermined time period in the presence of sequential operation of said switches.

4. A method of monitoring the temperature of a motor, said method comprising the steps of:
   sensing the temperature of said motor at a plurality of points within the winding of said motor through a plurality of temperature sensors;
   sensing the ambient temperature in the vicinity of said motor;
   comparing the voltage outputs of said plurality of sensors with a predetermined voltage representing a predetermined upper limiting temperature, and generating a first control output when said predetermined upper limiting temperature is reached by any of said sensors;
   comparing the voltage output of one of said plurality of sensors with a predetermined voltage representing a predetermined lower limiting temperature and generating a second control output when said predetermined lower limiting temperature is reached;
   comparing the voltage output of one of said plurality of sensors with the voltage output of said ambient temperature sensor plus a predetermined constant voltage representative of a predetermined temperature above ambient and generating a third control output when said temperature at said one sensor is below said predetermined temperature above ambient;
   generating a fourth control signal output in response to any of said first, second and third outputs generated in said comparing steps.

5. A method as defined in claim 4 including the step of utilizing said fourth control signal output to inhibit the application of power to said motor.

6. A temperature sensing means for a motor, comprising:
   temperature sensing means for sensing temperature, said temperature sensing means including a plurality of temperature sensors positioned within the winding of said motor;
   ambient temperature means for sensing ambient temperature, said ambient temperature means including an ambient temperature sensor positioned to sense the ambient temperature in the vicinity of said motor;
   first comparator means for comparing the voltage outputs of said plurality of sensors with a predetermined voltage representing a predetermined upper limiting temperature, said first comparator means generating a first control output when said predetermined upper limiting temperature is reached;

second comparator means for comparing the voltage output of one of said plurality of sensors with a predetermined voltage representing a predetermined lower limiting temperature, said second comparator means generating a second control output when said predetermined lower limiting temperature is reached;

third comparator means for comparing the voltage output of said one of said plurality of sensors with the voltage output of said ambient temperature sensor plus a predetermined constant voltage representative of a predetermined temperature above ambient, said third comparator means generating a third control output when said temperature at said one sensor is below said predetermined temperature above ambient; and means for generating a fourth control signal output in response to any of said outputs of said first, second and third comparator means.

7. A temperature monitoring system as defined in claim 6 including:

means for inhibiting the application of power to said motor in response to said fourth control signal output.

8. A temperature monitoring system as defined in claim 6 including:

means for recalibrating said first comparator means in response to said first and fourth control signal; and means for recalibrating said third comparator means to provide a voltage representing a higher predetermined constant voltage representative of a predetermined temperature above ambient in response to said third and fourth control signal output.

9. A temperature monitoring system as defined in claim 8 including:

means for inhibiting the application of power to said motor in response to said fourth control signal output.

10. A method of protecting a two-speed motor driving a compressor, comprising the steps of:

monitoring speed change command information and generating a first control signal in response to detection of a speed change command;

generating a first inhibit control signal for a first predetermined time period in response to said first control signal, said first inhibit control signal turning off the power to said motor;

monitoring a plurality of motor and system parameters and generating a second control signal in response to detection of any of said parameters exceeding in associated limit;

generating a second inhibit control signal for a second predetermined time period in response to said second control signal in the absence of said first inhibit control signal, said second inhibit control signal turning off the power to said motor.

11. Motor protection system for a two speed motor driving a compressor, comprising:

means for monitoring speed change command information and generating a first control signal in response to detection of a speed change command;

means for generating a first inhibit control signal for a first predetermined time period in response to said first control signal, said first inhibit control signal turning off the power to said motor;

means for monitoring a plurality of motor and system parameters and generating a second control signal in response to detection of any of said parameters exceeding an associated limit;

means for generating a second inhibit control signal for a second predetermined time period in response to said second control signal in the absence of said first inhibit control signal, said second inhibit control signal turning off the power to said motor.

12. A motor protection system as defined in claim 11, wherein said means for generating a first inhibit control signal includes a first timing circuit and said means for generating a second inhibit control signal includes a second timing circuit having a longer duration than said first timing circuit.

13. A motor protection system as defined in claim 11 wherein:

said means for monitoring speed change command information includes a low-to-high speed and high-to-low speed sequence detectors the inputs of which are derived from the closing and opening of first and second thermostatic switches sequentially operative in response to temperature change, said sequence detectors producing said first control signal in response to the sequential operation of said switches within a third predetermined time period.

14. A motor protection system as defined in claim 13, wherein said means for generating a first inhibit control signal includes a first timing circuit and said means for generating a second inhibit control signal includes a second timing circuit having a longer duration than said first timing circuit.

* * * * *